United States Patent [19]

Blackman

[11] Patent Number: 5,473,517

[45] Date of Patent: Dec. 5, 1995

[54] EMERGENCY SAFETY LIGHT

[76] Inventor: Stephen E. Blackman, 248 Columbia Turnpike, Florham Park, N.J. 07932

[21] Appl. No.: 377,046

[22] Filed: Jan. 23, 1995

[51] Int. Cl.$^6$ ................................................ F21V 33/00
[52] U.S. Cl. ............................ 362/95; 362/20; 362/183; 200/312; 200/317
[58] Field of Search .............................. 362/20, 95, 183, 362/200; 200/310, 312, 317

[56] References Cited

U.S. PATENT DOCUMENTS

| | | | |
|---|---|---|---|
| 4,001,803 | 1/1977 | Lombardo | 362/20 X |
| 4,611,264 | 9/1986 | Bradley | 362/95 |
| 4,631,649 | 12/1986 | McCue et al. | 362/20 X |

Primary Examiner—Stephen F. Husar
Attorney, Agent, or Firm—Ezra Sutton

[57] ABSTRACT

The present invention provides a housing for an emergency light source which is electrically connectable to a conventional light switch. The housing replaces a conventional switch plate and has at least one opening for receiving the switch actuator of the light switch. The replacement housing includes wires for electrical connection to the light switch and is divided into upper and lower housing sections, wherein the upper section includes a battery compartment, a printed circuit board compartment, and an opening to receive the switch actuator. The lower housing section includes a compartment for receiving a compact fluorescent lamp, reflectors, and a diffuser cover. The printed circuit board includes a recharger for the batteries; a power-sensing device for sensing power interruption; an ON/OFF relay switch which is turned on in response to a power failure and actuates the emergency light source; a LED charging indicator light to show that the batteries are charging; a manual test switch; and a transformer, a fluorescent ballast, and starter components for the fluorescent lamp.

15 Claims, 4 Drawing Sheets

EMERGENCY SAFETY LIGHT

FIELD OF THE INVENTION

The invention relates to a housing for an emergency light source and, more particularly, an emergency light source for automatically illuminating an area in response to a power failure.

BACKGROUND OF THE INVENTION

Frequently, homes, offices, and industrial plant facilities experience many types of emergency situations involving power failures where an interior or exterior area has no light. The power failures may be caused by electrical short circuits, brown-outs, fire, accidents, natural disasters (i.e., floods, hurricanes, tornadoes, etc.), or a planned shutoff of electricity to a facility or dwelling. As a result of these emergencies, most facilities, and especially residential homes, do not have emergency generators to provide lighting, or they only have emergency lighting in the form of portable light sources, such as flashlights.

A need exists for a simple and easily installable emergency light source which includes a fixedly-attached housing for replacement of standard switch plates and which activates itself in response to a power failure of any kind.

DESCRIPTION OF THE PRIOR ART

Switch plate devices having an illumination source and/or having a rechargeable flashlight contained thereon are commercially available and have been disclosed in the prior art. For example, U.S. Pat. No. 4,514,789 discloses a housing on a switch plate having an LED to locate a light switch in the dark. U.S. Pat. No. 4,611,264 discloses a housing adhesively attached to a switch plate having a light to locate the light switch in the dark. The housing can be removed and used as a flashlight.

The prior art devices do not disclose a housing which is easily installable and connectable to a conventional light switch to provide automatic illumination to an area when a power failure occurs.

Accordingly, it is a primary object of the present invention to provide a simple and easily installable emergency light source which includes a housing for the replacement of standard switch plates and which activates itself in response to a power failure of any kind.

Another object of the present invention is to provide a housing for an emergency light source which is electrically connectable to a conventional light switch.

Another object of the present invention is to provide an emergency light source which is battery operated and can operate with different types of light sources, such as a fluorescent lamp or an incandescent lamp.

A further object of the present invention is to provide an emergency light source which has a sensing device for sensing a power failure and automatically actuating the emergency light source.

A still further object of the present invention is to provide a housing for an emergency light source which can be mass produced in an automated and economical manner and is relatively inexpensive.

SUMMARY OF THE INVENTION

The present invention provides a housing for an emergency light source which is electrically connectable to a conventional light switch. The housing replaces a conventional switch plate and has at least one opening for receiving the switch actuator of the light switch. The housing may have several switch openings for a plurality of switch actuators. The housing includes wires for electrical connection to the light switch.

The housing is divided into upper and lower sections, wherein the upper section includes a battery compartment, a printed circuit board compartment, and an opening to receive the switch actuator. The lower housing section includes a compact fluorescent lamp having reflectors and a diffuser cover.

The fluorescent lamp is connected to the batteries via the printed circuit board. The printed circuit board includes a recharger for the batteries; a power-sensing device for sensing power interruption; an ON/OFF relay switch which is turned on in response to a power failure; a LED charging indicator light to show that the batteries are charging; a manual test switch; and a transformer, fluorescent ballast, and starter components for the fluorescent lamp. The printed circuit board is electrically connected to the light switch.

Alternatively, the power source may be located outside of the housing at a remote location, and the light source may be one or more incandescent lamps.

BRIEF DESCRIPTION OF THE DRAWINGS

Further objects, features, and advantages of the present invention will become apparent upon consideration of the detailed description of the presently-preferred embodiments, when taken in conjunction with the accompanying drawings, wherein.

DETAILED DESCRIPTION OF THE PREFERRED EMBODIMENT

Figure 1:
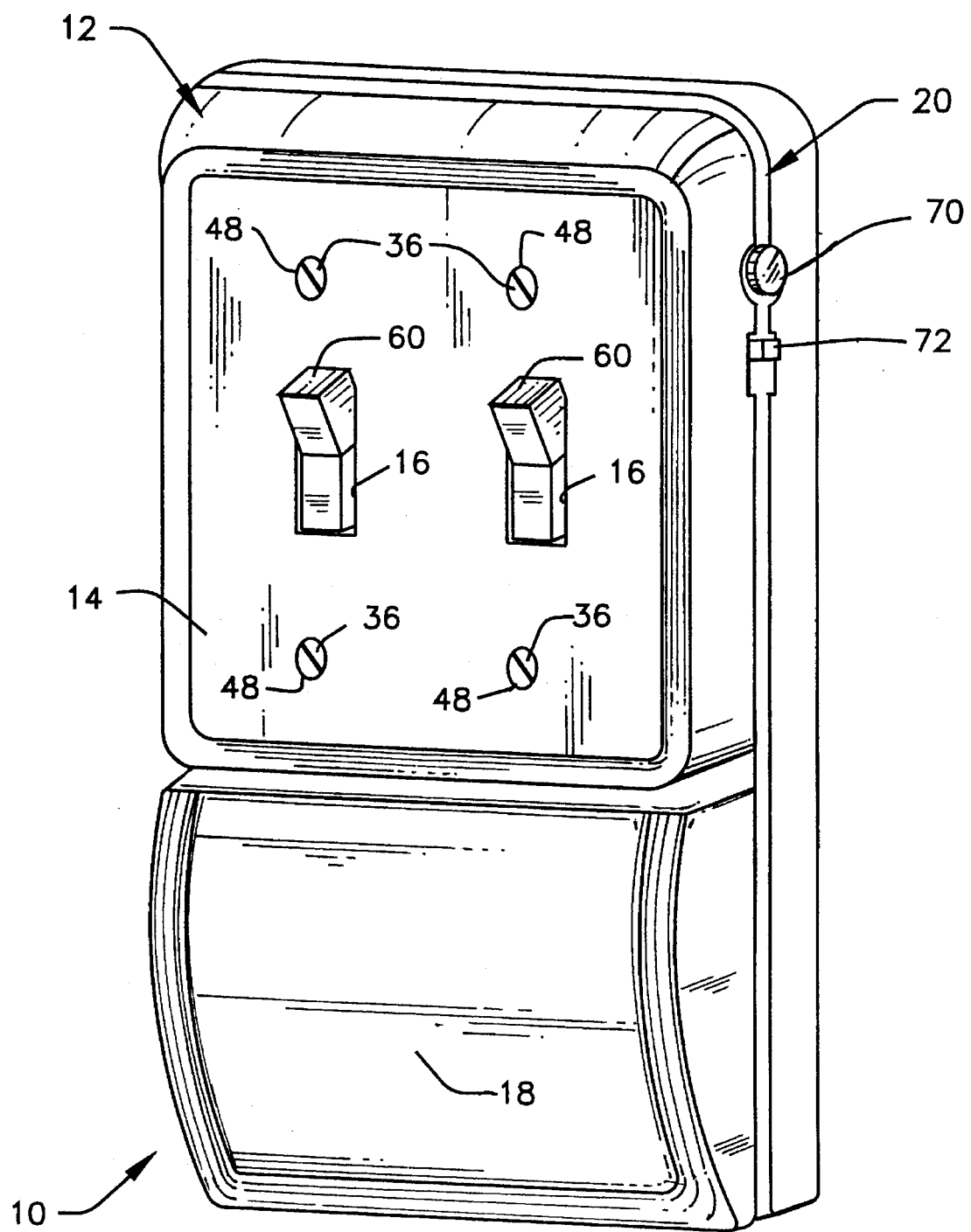
FIG. 1 is a perspective view of the present invention showing the emergency safety light having two switch actuators, a switch cover, and a light diffuser cover.
Figure 4:
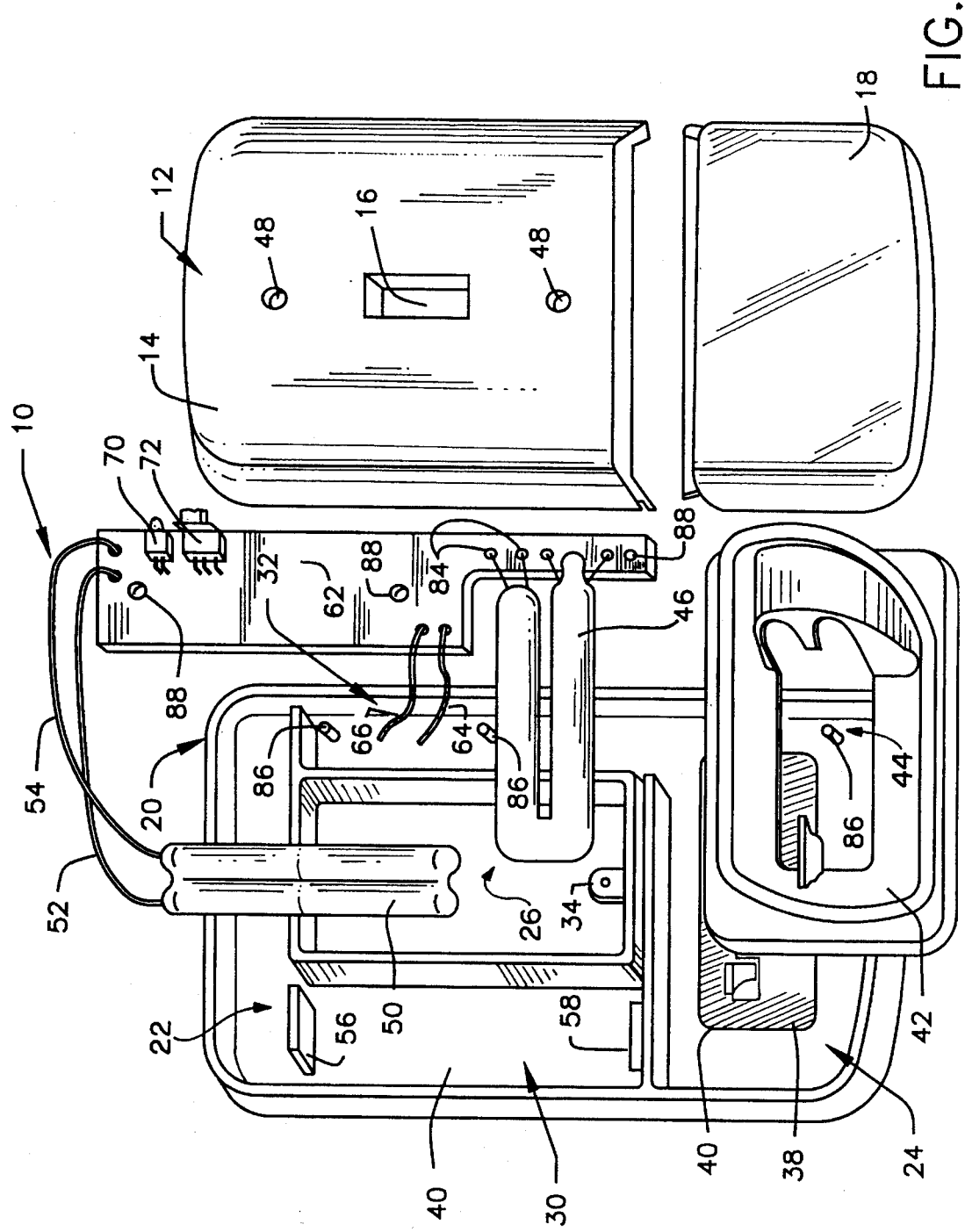
FIG. 4 is a breakaway perspective view of the present invention showing the upper and lower sections of the housing which depicts the battery compartment, the batteries, the light switch opening, the printed circuit board compartment, the P.C. board, the fluorescent lamp compartment, the fluorescent lamp, the mylar reflector, and the plastic reflector.

The preferred embodiment of the present invention provides for an emergency safety light housing 10 having front and rear housing sections 12 and 20, as shown in FIG. 1 of the drawings. The front housing section 12 comprises an upper plastic switch plate cover 14 having at least one light switch opening 16 and a lower clear acrylic diffuser cover 18. Switch plate cover 14, in other embodiments, may have a plurality of switch openings 16 to accommodate the light switch actuators 60. Switch actuators 60 may be of any type, such as the one shown, or a rocker-arm type. Switch plate cover 14 may also have a plurality of mounting openings 48 for mounting screws 36, as depicted in FIGS. 1 and 4. Switch plate cover 14 may be of plastic, metal, wood, ceramic, or other suitable materials of varying colors and designs. The housing 10, in alternate embodiments, may have shapes that are spherical, oval, cylindrical, or other suitable geometrical designs.

Figure 2:
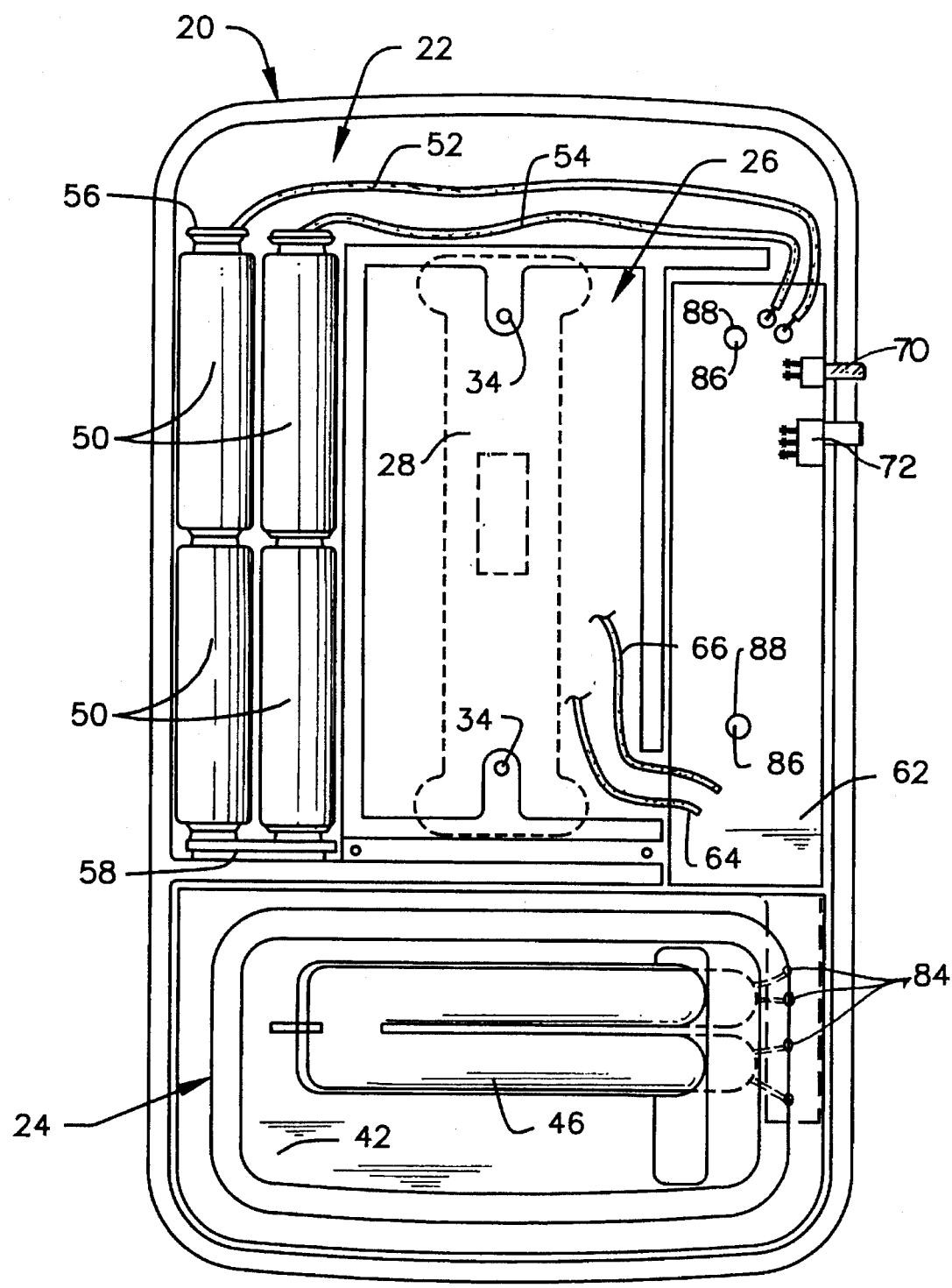
FIG. 2 is a front plan view of the present invention with the cover removed, showing the upper and lower sections of the housing having the batteries, the printed circuit board, and the compact fluorescent lamp.

The rear housing section 20, as depicted in FIGS. 2 and 4, comprises an upper section 22 and a lower section 24. The upper housing section 22 includes an opening 26 for receiving the light switch assembly 28, a battery compartment 30, a printed circuit board compartment 32, and a plurality of mounting receptacle holders 34 for receiving mounting screws 36 for cover plate 14.

The lower housing section 24 includes a metallized mylar reflective film 38 permanently affixed to the rear wall 40 of housing section 20; a metallized plastic reflector 42 having a concave shape and an opening 43 aligned with reflective film 38; and a compartment 44 for receiving a light source 46. Light source 46 can be a fluorescent lamp fixture of 5, 7, or 9 watts of power, or it can be one or more incandescent lamps having 15 or 25 watts of power. Of course, other wattages may be used, and other types of light sources may be used, where appropriate. Light source 46 is hard wired at 84 to the circuit board 62.

Figure 3:
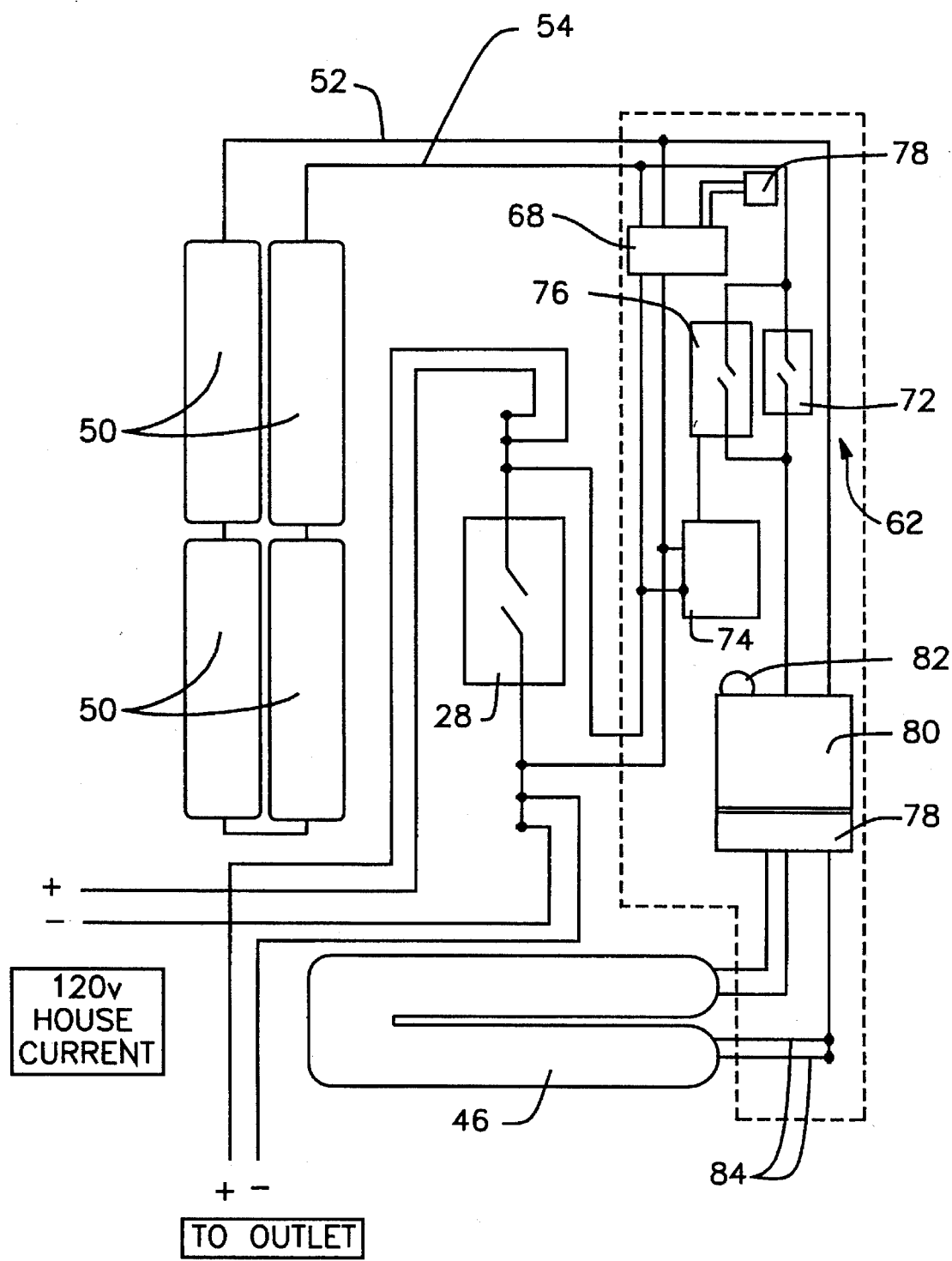
FIG. 3 is a circuit diagram for the emergency light showing the circuit wiring for the batteries, printed circuit board, and the compact fluorescent lamp.

The electrical arrangement of the present invention, as shown in FIGS. 3 and 4, includes circuit wires 64 and 66 connected to circuit board 62 for connection to light switch assembly 28 after the conventional switch plate has been removed. Circuit board 62 also includes components for a battery recharger 68 for charging batteries 50; a charging indicator light 70, such as an LED, that remains ON to indicate that the batteries are recharging; a manual test switch 72 for testing the functioning of light source 46; a power interruption detector 74 for sensing a power failure; an ON/OFF relay switch 76 which is turned ON in a response to a power failure; and a transformer 78, a fluorescent ballast 80, and a starter 82 for fluorescent light source 46. The printed circuit board 62 has openings 88 for holding braces 86 located on wall 40, which holds the circuit board 62 firmly in place when emergency light housing 10 is on a wall in a dwelling or other building.

The power source 50 can be a battery or plurality of batteries for energizing the light source 46 when a power failure occurs. In this preferred embodiment, as shown in FIGS. 2, 3, and 4, the power source 50 is a series of four AA batteries. The batteries 50 are placed in the battery compartment 30 between receptor plates 56, 58 and are electrically connected via circuit wires 52, 54 to the printed circuit board 62. In an alternate embodiment, the power source 46 may be located outside of the housing 10 at a remote location in the form of solar energy cells, a hydrological energy source, 12-volt batteries, or other appropriate power sources, which can energize the light source 46 when a power failure occurs.

OPERATION AND INSTALLATION OF THE PRESENT INVENTION

When a power failure occurs, the power interruption detector 74 senses this loss of power and causes the ON/OFF relay switch 76 to move to the ON position. This allows energy to be supplied from the power source 50 to the light source 46, which instantly illuminates the unlighted area. The mylar reflective film 38 and metallized plastic reflector 42 enhance the amount and area of illumination.

Prior to a power failure, operation of the LED charging indicator light 70 shows that the power source of batteries 50 is charging, and a manual test of switch 72 tests the functioning of the light source 46 to see if illumination occurs.

To install the housing 10 of the present invention, it is only necessary to remove the conventional switch plate and then connect switch circuit wires 64 and 66 of the printed circuit board 62 in the upper housing section 22 to the light switch 28. The emergency light source 46 is not energized by this connection until there is a power failure, or until there is a manual testing of test switch 72, which illuminates the light source 46.

ADVANTAGES OF THE PRESENT INVENTION

Accordingly, a primary advantage of the present invention is that it provides a simple and easily installable emergency light source which includes a fixedly-attached housing for the replacement of standard switch plates and which activates itself in response to a power failure of any kind.

Another advantage of the present invention is that it provides a housing for an emergency light source which is electrically connectable to a conventional light switch.

Another advantage of the present invention is that it provides an emergency light source which is battery operated and can operate with different types of light sources, such as a fluorescent lamp or an incandescent lamp.

A further advantage of the present invention is that it provides an emergency light source which has a sensing device for sensing a power failure and automatically actuating the emergency light source.

A still further advantage of the present invention is that it provides a housing for an emergency light source which can be mass produced in an automated and economical manner and is relatively inexpensive.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. A housing for an emergency light source which is electrically and mechanically connectable to a conventional light switch, comprising:

a) a housing for replacement of a conventional switch plate having at least one opening for receiving the switch actuator of said light switch;

b) a first compartment in said housing for receiving batteries;

c) a second compartment in said housing for receiving an emergency light source adapted to be connected to said batteries;

d) means for sensing the loss of electrical power to said light switch and, in response thereto, for actuating said emergency light source; and e) means for electrically connecting said housing to said light switch.

2. A housing in accordance with claim 1, wherein said first compartment is adapted to receive four "AA" batteries.

3. A housing in accordance with claim 1, wherein said second compartment is adapted to receive a 5-watt, 7-watt, or 9-watt fluorescent lamp as said emergency light source.

4. A housing in accordance with claim 1, wherein said second compartment is adapted to receive at least one incandescent lamp as said emergency light source.

5. A housing in accordance with claim 1, further including a PC board containing said sensing means.

6. A housing in accordance with claim 1, wherein said means for electrically connecting said housing to said light switch includes a pair of electrical wires.

7. A housing in accordance with claim 1, wherein said sensing means includes power-interruption detector means connected to an on/off relay switch, wherein said power-interruption detector means detects the loss of electrical power to said light switch and operates to turn on said relay switch.

8. A housing in accordance with claim 1, further including a charging means for recharging said batteries.

9. A housing in accordance with claim 1, further including a charging indicator light for indicating that said batteries are recharging.

10. A housing in accordance with claim 1, further including a manual test switch for testing the functioning of said emergency light source.

11. A housing in accordance with claim 1, wherein said housing includes a switch plate cover having at least one light switch opening.

12. A housing in accordance with claim 1, wherein said housing includes a diffuser cover for diffusing light from said light source.

13. A housing in accordance with claim 1, wherein said housing includes a compartment for receiving a printed circuit board.

14. A housing in accordance with claim 1, wherein said housing further includes at least one metallized reflector for reflecting light from said light source.

15. A housing for an emergency light source which is electrically and mechanically connectable to a conventional light switch, comprising:

a) a housing for replacement of a conventional switch plate having at least one opening for receiving the switch actuator of said light switch;

b) means for connecting said housing to a remote power source;

c) a compartment in said housing for receiving at least one emergency light source adapted to be connected to said power source;

d) means for sensing the loss of electrical power to said light switch and, in response thereto, for actuating said emergency light source; and e) means for electrically connecting said housing to said light switch.

* * * * *